US008341351B2

(12) United States Patent
Tsumura (10) Patent No.: US 8,341,351 B2
(45) Date of Patent: Dec. 25, 2012

(54) DATA RECEPTION SYSTEM WITH DETERMINATION WHETHER TOTAL AMOUNT OF DATA STORED IN FIRST STORAGE AREA EXCEEDS THRESHOLD

(75) Inventor: Takeo Tsumura, Tokyo (JP)

(73) Assignee: Sony Corporation, Tokyo (JP)

( * ) Notice: Subject to any disclaimer, the term of this patent is extended or adjusted under 35 U.S.C. 154(b) by 582 days.

(21) Appl. No.: 12/153,403

(22) Filed: May 19, 2008

(65) Prior Publication Data

US 2009/0031092 A1   Jan. 29, 2009

(30) Foreign Application Priority Data

Jul. 27, 2007 (JP) .................. 2007-195775

(51) Int. Cl.
*G06F 12/08* (2006.01)
(52) U.S. Cl. ................ 711/117; 711/E12.016; 709/250; 710/57
(58) Field of Classification Search .................. None
See application file for complete search history.

(56) References Cited

U.S. PATENT DOCUMENTS

| | | | | |
|---|---|---|---|---|
| 5,687,316 | A * | 11/1997 | Graziano et al. | 709/250 |
| 5,717,855 | A * | 2/1998 | Norman et al. | 709/250 |
| 6,112,252 | A * | 8/2000 | Hausman et al. | 709/250 |
| 6,192,428 | B1 * | 2/2001 | Abramson et al. | 710/52 |
| 6,397,287 | B1 * | 5/2002 | Brown et al. | 710/305 |
| 6,968,358 | B2 * | 11/2005 | Freimuth et al. | 709/203 |
| 2003/0172169 | A1 * | 9/2003 | Cheng | 709/230 |

FOREIGN PATENT DOCUMENTS

| | | |
|---|---|---|
| JP | 05-158865 | 6/1993 |
| JP | 08-065334 | 3/1996 |
| JP | 2000-259524 | 9/2000 |

OTHER PUBLICATIONS

Ken Yocum and Jeff Chase. "Payload Caching: High-Speed Data Forwarding for Network Intermediaries." Jun. 2001. USENIX. 2001 USENIX Annual Technical Conference.*
IBM. "Micro Channel Architecture." Sep. 1990. pp. i-12 and 83-97.*
Ulf Bodin et al. "Load-tolerant Differentiation with Active Queue Management." Jul. 2000. ACM. ACM SIGCOMM Computer Communication Review. vol. 30. pp. 4-16.*

* cited by examiner

*Primary Examiner* — Charles Rones
*Assistant Examiner* — Nathan N Sadler
(74) *Attorney, Agent, or Firm* — Rader Fishman & Grauer, PLLC (57) ABSTRACT

A data reception system includes a data acquisition unit acquiring data from a predetermined transmission path, an access control unit storing the data acquired by the data acquisition unit in a predetermined storage area, and a plurality of storage areas. The plurality of storage areas includes a first storage area and a second storage area having a greater storable capacity and a lower storing speed compared to the first storage area. The access control unit further includes a transfer unit. The access control unit determines whether the total amount of data stored in the first storage area is in the excess of a predetermined threshold or not and causes a transfer unit to transfer the data acquired by the data acquisition unit to the second storage area to store the data in the second storage area when the total amount is in the excess of the threshold.

9 Claims, 4 Drawing Sheets

RELATED ART

DATA RECEPTION SYSTEM WITH DETERMINATION WHETHER TOTAL AMOUNT OF DATA STORED IN FIRST STORAGE AREA EXCEEDS THRESHOLD

CROSS REFERENCES TO RELATED APPLICATIONS

The present invention contains subject matter related to Japanese Patent Application JP 2007-195775 filed in the Japanese Patent Office on Jul. 27, 2007, the entire contents of which are incorporated herein by reference.

BACKGROUND OF THE INVENTION

1. Field of the Invention

The present invention relates to a data reception system for receiving data from a predetermined transmission path.

2. Description of the Related Art

Systems for transmitting and receiving information through a transmission path of a network, such as a LAN (Local Area Network), are spreading. Ethernet (registered trademark) is one of standards of such systems.

According to the Ethernet, data transmission and reception processes are performed by a controller (a CPU: Central Processing Unit) of a system as a whole and an access control unit (MAC: Media Access Controller) using transmission and reception descriptors. A descriptor is transmission/reception control information indicating the direction of a data transfer (transmission or reception), the storage position (address) of the transmitted or received data in a storage area, and the size of the data. In particular, a reception descriptor is a record of an address of a buffer memory where received data is stored.

For example, when data are transmitted, the CPU generates a transmission descriptor, and the MAC reads the data to be transmitted from the buffer memory by referring to the transmission descriptor and transmits the data. On the contrary, when data are received, the CPU generates a reception descriptor, and the MAC writes the received data in the buffer memory and updates the reception descriptor based on the address of the written data.

A description now will be given of an example of an apparatus for receiving data through a transmission path, such as the Ethernet, according to the related art.

Figure 1:
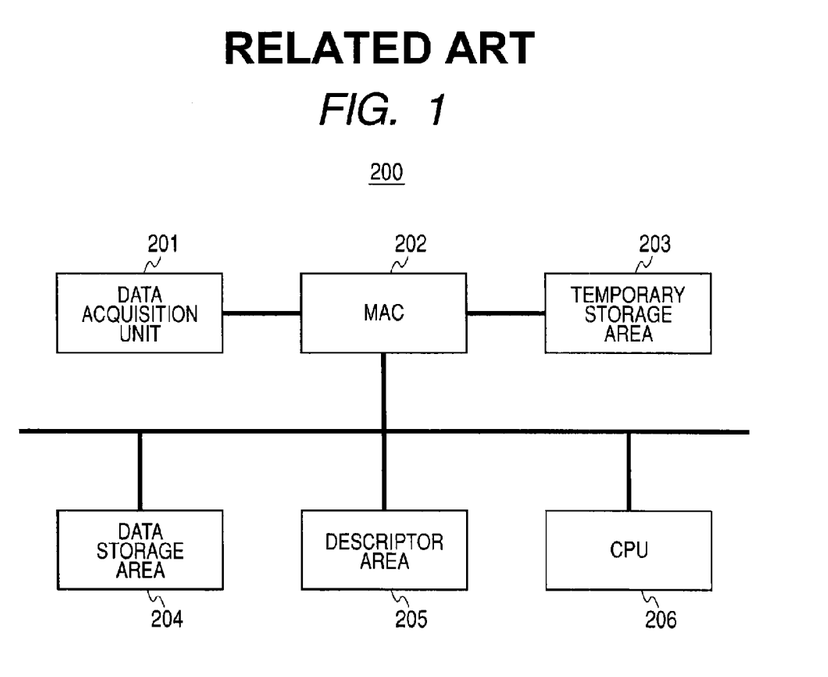
FIG. 1 is a block diagram showing an example of a configuration of a data transmission/reception apparatus according to the related art.

FIG. 1 is a block diagram showing an example of a configuration of a data reception system 200 according to the related art.

As shown in FIG. 1, the data reception system 200 includes a data acquisition unit 201, a MAC 202, a temporary storage area 203, a data storage area 204, a descriptor area 205, and a CPU 206.

The data acquisition unit 201 is physically connected to a transmission path through a LAN cable to acquire data from the transmission path. Data equal to or smaller than a predetermined data size are continually transmitted from the transmission path, and the data acquisition unit 201 therefore continually receives data. The data acquisition unit 201 is directly connected to the MAC 202, which will be described later, and the unit transfers data acquired from the transmission path to the MAC 202.

The MAC 202 controls the reception of data by referring to a reception descriptor generated by the CPU 206, which will be described later. First, the MAC 202 temporarily stores the data acquired by the data acquisition unit 201 in the temporary storage area 203, which will be described later. Thereafter, the MAC refers to the reception descriptor that is stored in the descriptor area to transfer the data to a position in the data storage area 204 described in the reception descriptor on a DMA (Direct Memory Access) basis, thereby storing the data in that position. Details of the reception process exercised by the MAC 202 will be described later.

The MAC 202 includes the temporary storage area 203.

The temporary storage area 203 is a storage area for temporarily storing data received by the MAC 202 before storing the data in the data storage area 204, which will be descried later. The temporary storage area 203 is provided for the purpose of absorbing a delay that occurs when the data received by the MAC 202 is transferred to the data storage area 204 and stored therein.

The data storage area 204 is a storage area for storing received data. The CPU 206, which will be described later, executes predetermined processes using data stored in the data storage area 204.

The descriptor area 205 is a storage area for storing descriptors generated by the CPU 206, and a predetermined number of descriptors can be stored in the area.

The CPU 206 is an arithmetic control unit for controlling the data reception system 200 as a whole.

The CPU 206 reads data stored in the data storage area 204 and executes predetermined processes using the data.

Further, the CPU 206 generates transmission and reception descriptors in preparation for the transmission and reception of information and stores them in the descriptor area 205.

An example of a data receiving operation of such a data reception system 200 according to the related art is as follows.

The CPU 206 generates a plurality of descriptors (reception descriptors) in preparation for the reception of a plurality of pieces of data, stores the descriptors in the descriptor area 205, and notifies the MAC 202 of the presence of the descriptors thus generated. The MAC 202 stores data acquired by the data acquisition unit 201 from the transmission path in the temporary storage area 203 as received data. When the MAC 202 is notified of the presence of the new descriptors by the CPU 206, the MAC transfers the received data stored in the temporary storage area 203 on a DMA basis to store the data in the data storage area 204 based on the information described in relevant descriptors. When the transfer is finished, the MAC 202 updates the descriptors that have been referred to based on the amount of the received data that has been transferred and information on the storage position of the data (information on the address of the data in the data storage area), and the MAC notifies the CPU 206 of the completion of reception. The CPU 206 reads the data that has been received from the data storage area 204 and executes a predetermined process using the data thus read. Such a process is repeated for each set of data having a predetermined size acquired by the data acquisition unit 201.

An example of such a data transmission/reception apparatus according to the related art is disclosed in JP-A-05-158865 (Patent Document 1).

SUMMARY OF THE INVENTION

In the data reception system 200 as an example of a data transmission/reception apparatus according to the related art, as described above, data acquired by the data acquisition unit 201 are temporarily stored in the temporary storage area 203 by the MAC 202 and thereafter stored in the data storage area 204 according to descriptors.

The storage capacity of the temporary storage area 203 is not so large because the area is a storage area disposed to merely temporarily store data received by the data acquisition unit 201. For example, the storage capacity of the temporary storage area 203 is about 8 Kbytes to 64 Kbytes. In the case of the Ethernet (registered trademark), the amount of data receivable in a frame (one opportunity of reception) having the maximum frame size is normally about 1.5 Kbytes. Therefore, when a plurality of pieces of data is received continuously, the following problem arises. The temporary storage area 203 is fully occupied by pieces of data that are received while pieces of data received prior to them are transferred by the MAC 202 from the temporary storage area 203 to the data storage area 204. As a result, pieces of data received thereafter cannot be stored in the temporary storage area 203, and therefore the reception of data may be disabled.

The invention addresses the above-described problem; and it is desirable to provide a data reception system having a plurality of storage areas different in storage capability, in which data can be properly stored when the data are received.

A data reception system according to an embodiment of the invention includes a data acquisition unit acquiring data from a predetermined transmission path, an access control unit storing the data acquired by the data acquisition unit in a predetermined storage area, and a plurality of storage areas. The plurality of storage areas includes a first storage area and a second storage area having a greater storable capacity and a lower storing speed compared to the first storage area. The access control unit further includes a transfer unit. The access control unit determines whether the total amount of data stored in the first storage area is in excess of a predetermined threshold or not and causes a transfer unit to transfer the data acquired by the data acquisition unit to the second storage area to store the data in the second storage area when the total amount is in excess of the threshold.

A data reception system according to another embodiment of the invention includes a data acquisition unit acquiring data from a predetermined transmission path, an access control unit storing the data acquired by the data acquisition unit in a predetermined storage area, a plurality of storage areas, a descriptor area configured to allow storage of a reception descriptor concerning a position in a storage area where the data is stored, and a control unit. The plurality of storage areas includes a first storage area and a second storage area having a greater storable capacity and a lower storing speed compared to the first storage area. The access control unit further includes a transfer unit. The access control unit determines whether the total amount of data stored in the first storage area is in excess of a predetermined threshold or not, causes the transfer unit to transfer the data acquired by the data acquisition unit to the second storage area to store the data in the second storage area based on position information described in the reception descriptor when the total amount is in the excess of the threshold, updates the reception descriptor by adding a flag indicating that the reception descriptor is in use to the descriptor, and notifies the control unit of the update of the reception descriptor. The control unit reads the data stored in the first storage area or the second storage area by referring to the reception descriptor and executes a predetermined process using the data.

A data reception system according to another embodiment of the invention includes a data acquisition unit acquiring data from a predetermined transmission path, an access control unit storing the data acquired by the data acquisition unit in a predetermined storage area, a plurality of storage area including a first storage area and a second storage area having a greater storable capacity and a lower storing speed compared to the first storage area, a descriptor area configured to allow storage of a reception descriptor allowing a description of information on the position in the first storage area or the second storage area where the data acquired by the data acquisition unit are to be stored, and a control unit generating a reception descriptor excluding the information on the position to store data before the data acquisition unit acquires data and storing the descriptor in the descriptor area. The access control unit further includes a control unit. The access control unit determines whether the total amount of data stored in the first storage area is in excess of a predetermined threshold or not, causes the transfer unit to transfer the data acquired by the data acquisition unit to the second storage area to store the data in the second storage area based on position information described in the reception descriptor when the total amount is in excess of the threshold, and describes any reception descriptor in the descriptor area to include information on the position in the first storage area or the second storage area where the data acquired by the data acquisition unit is to be stored when the data are stored in the first storage area or the second storage area. The control unit reads the data stored in the first storage area or the second storage area by referring to the reception descriptor and executes a predetermined process using the data.

A data reception system according to another embodiment of the invention includes a data acquisition unit acquiring data from a predetermined transmission path, an access control unit storing the data acquired by the data acquisition unit in a predetermined storage area, a plurality of storage areas including a first storage area and a second storage area having a greater storable capacity and a lower storing speed compared to the first storage area, a descriptor area configured to allow storage of a reception descriptor allowing a description of information on the position in the first storage area or the second storage area where the data acquired by the data acquisition unit is to be stored, and a control unit. The access control unit further includes a transfer unit. The access control unit determines whether the total amount of data stored in the first storage area is in excess of a predetermined threshold or not, causes the transfer unit to transfer the data acquired by the data acquisition unit to the second storage area to store the data in the second storage area based on position information described in the reception descriptor when the total amount is in excess of the threshold, and generates a reception descriptor describing information on the position in the first storage area or the second storage area where the data acquired by the data acquisition unit are to be stored when the data are stored in the first storage area or the second storage area. The control unit reads the data stored in the first storage area or the second storage area by referring to the reception descriptor and executes a predetermined process using the data.

The invention makes it possible to provide a data reception system including a plurality of storage areas having different storing capabilities, in which data can be stored by properly determining a storage area to store the data when the data are received.

DETAILED DESCRIPTION OF THE INVENTION

First Embodiment

A data reception system 100 which is a first embodiment of the data reception system according to the invention will now be described.

Figure 2:
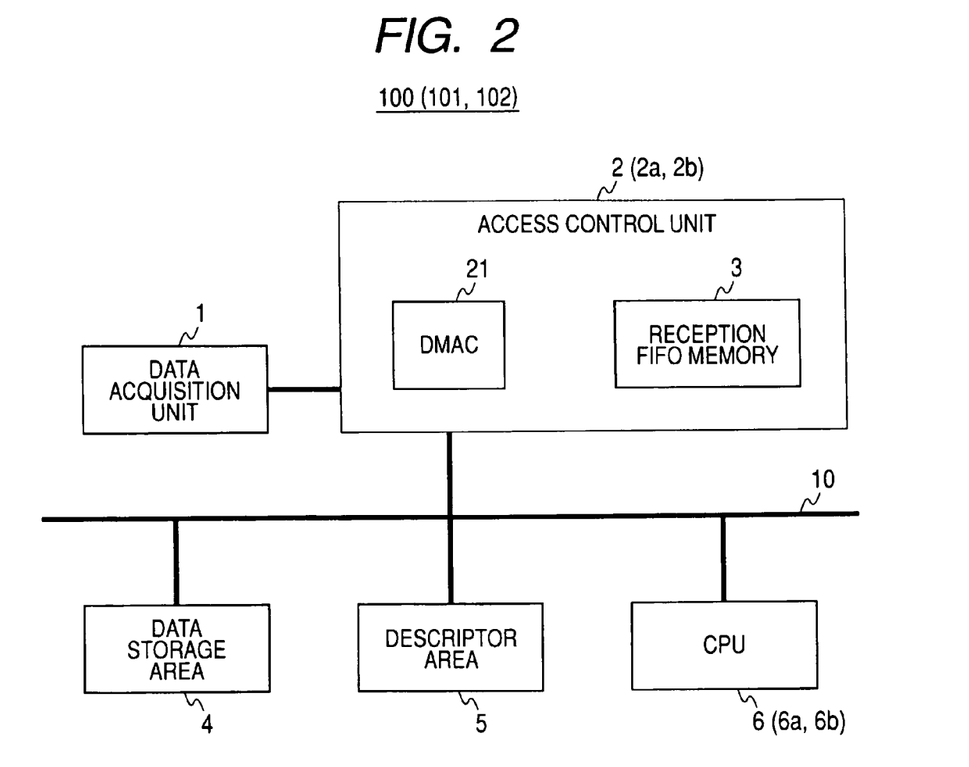
FIG. 2 is a block diagram showing an example of a configuration of a data reception apparatus according to a first embodiment of the invention.

FIG. 2 is a block diagram showing an example of a configuration of the data reception system 100.

As shown in FIG. 2, the data reception system 100 includes a data acquisition unit 1, an access control unit 2, a reception FIFO memory 3 (which corresponds to the first memory area of the invention), a data storage area 4 (which corresponds to the second memory area of the invention), a descriptor area 5, and a CPU 6 (which corresponds to the control unit of the invention).

The data acquisition unit 1 has a terminal for connecting a transmission path such as a LAN (Local Area Network), e.g., the Ethernet (registered trademark), and acquires data transmitted through the transmission path. The data acquisition unit 1 is directly connected to the access control unit 2, which will be described later, and the unit transfers data acquired from the transmission path to the access control unit 2. The data acquisition unit 1 executes a process of continually receiving data on the transmission path and passing it to the access control unit 2.

The access control unit 2 includes the reception FIFO memory 3.

The reception FIFO memory 3 is a storage area for storing data acquired by the access control unit 2 from the data acquisition unit 1.

The reception FIFO memory 3 is a buffer memory, such as an SRAM (Static Random Access Memory), having an FIFO (First-In, First-Out) structure. Such a memory has a storage capacity of about 8 Kbytes to 64 Kbytes in general. The reception FIFO memory 3 corresponds to the temporary storage area 203 in the data reception system 200 according to the related art described above with reference to FIG. 1.

The access control unit 2 receives data acquired by the data acquisition unit 1 from the transmission path and temporarily stores the acquired data in the reception FIFO memory 3. Thereafter, the access control unit 2 refers to the total amount of data in the reception FIFO memory 3. When the total amount is equal to or smaller than a predetermined threshold, the control unit leaves the data temporarily stored in the reception FIFO memory 3 as it is. When the total amount is in the excess of the predetermined threshold, the control unit transfers the data temporarily stored in the reception FIFO memory 3 to the data storage area 4 on a DMA basis to store the data therein. The predetermined threshold is a value determined according to the total capacity of the reception FIFO memory 3. In the present embodiment, there is no particular limitation on the method of setting the predetermined threshold.

For example, let us assume that a threshold of 32 Kbytes is set where the total capacity of the reception FIFO memory 3 is 64 Kbytes. When the total amount of data stored in the reception FIFO memory 3 is still smaller than 32 Kbytes after data are acquired by the access control unit 2 from the data acquisition unit 1 and temporarily stored in the reception FIFO memory 3, the new data are kept stored in the reception FIFO memory 3. When the total amount of data stored in the reception FIFO memory 3 exceeds 32 Kbytes, the data temporarily stored in the reception FIFO memory 3 are DMA-transferred to the data storage area 4 and stored therein.

When the data acquired by the data acquisition unit 1 is temporarily stored in the reception FIFO memory 3 or when the data stored in the reception FIFO memory 3 is DMA-transferred to the data storage area 4 to be stored therein, the access control unit 2 determines the position in the reception FIFO memory 3 or the data storage area 4 where the data is to be stored by referring to a reception descriptor.

A reception descriptor now will be described.

A reception descriptor is information describing address information, a data amount, and an in-use flag.

Address information is information indicating a position where data of interest is stored, and it indicates a position in the reception FIFO memory 3 or the data storage area 4. In the present embodiment, there is no particular limitation on the manner in which address information indicates a position in the reception FIFO memory 3 or the data storage area 4.

The data amount is the amount of data of interest (data size).

An in-use flag is a flag indicating whether a reception descriptor is in use or not. When the in-use flag of a reception descriptor is off, it means that no data is stored in the address indicated by the address information described in the reception descriptor. That is, the flag indicates that the reception descriptor can be used by the access control unit 2 (data can be stored in the address indicated by the address information described in the reception descriptor).

On the other hand, when the in-use flag of a reception descriptor is on, it means that data are stored in the address indicated by the address information described in the reception descriptor. That is, the flag indicates that the reception descriptor cannot be used (data cannot be stored in the address indicated by the address information described in the reception descriptor).

The present embodiment involves two types of reception descriptors, i.e., descriptors associated with the reception FIFO memory 3 and descriptors associated with the data storage area 4. Specifically, there are reception descriptors having address information indicating positions in the reception FIFO memory 3 where data are to be stored and reception descriptors having address information indicating positions in the data storage area 4 where data are to be stored.

A reception descriptor is generated by the CPU 6, which will be described later, and it is stored in the descriptor area 5, which will be described later. When a reception descriptor is generated by the CPU 6, only information on an address in the reception FIFO memory 3 or the data storage area 4 is described, and no description of the data amount has been made yet. The in-use flag is off.

When data are acquired from the data acquisition unit 1, the access control unit 2 refers to one of the reception descriptors associated with the reception FIFO memory 3 and stores the data in an address based on the address information described in the reception descriptor which has been referred to. After storing the data acquired from the data acquisition unit 1 in the reception FIFO memory 3 based on the address information described in the reception descriptor, the access control unit 2 updates the data amount in the relevant reception descriptor based on the amount of the data and also updates or turns the in-use flag in the reception descriptor on.

Thereafter, the access control unit 2 determines whether the total amount of data in the reception FIFO memory 3 has exceeded the predetermined threshold or not to decide whether to transfer the data to the data storage area 4. When the data is to be transferred to the data storage area 4, the access control unit 2 refers to a reception descriptor associated with the data storage area 4 and stores the data in an address based on the address information described in the reception descriptor which has been referred to. At the same time, the unit updates the data amount in the associated reception descriptor and also updates or turns the in-use flag in the relevant reception descriptor on. When the data is not transferred to the data storage area 4, no update is made.

The access control unit 2 includes a DMAC (Direct Memory Access Controller) 21. The DMAC 21 is a controller for transferring the data stored in the reception FIFO memory 3 to the data storage area 4 on a DMA basis. The DMAC 21 exercises transfer control to transfer data between memories or between a memory and an I/O (In/Out) device on a DMA (Direct Memory Access) basis. When the access control unit 2 has decided to transfer the data stored in the reception FIFO memory 3 to the data storage area 4, the DMAC 21 exercises transfer control for transferring the data stored in the reception FIFO memory 3 to the data storage area 4 on a DMA basis.

The data storage area 4 is a storage area which includes a SDRAM (Synchronous Dynamic Random Access Memory) and which has a larger capacity when compared to the reception FIFO memory 3. For example, the area has a storage capacity of 256 Mbytes. Data transferred from the reception FIFO memory 3 by the DMAC 21 of the access control unit 2 are stored in the data storage area 4.

A comparison between the reception FIFO memory 3 and the data storage area 4 reveals their characteristics as follows. The reception FIFO memory 3 operates at a high speed, although it has a small capacity. The data storage area 4 is slow when compared to the reception FIFO memory 3, although it has a larger capacity. Therefore, it is desirable that the reception FIFO memory 3 and the data storage area 4 are storage media having such characteristics, and the reception FIFO memory 3 and the data storage area 4 do not necessarily include a SRAM and a SDRAM respectively as described above.

The descriptor area 5 is a storage area for storing reception descriptors, as described above.

The CPU 6 exercises overall control of various parts of the data reception system 100.

The CPU 6 generates reception descriptors specifying addresses in the FIFO memory 3 for storing data and reception descriptors specifying addresses in the data storage area 4 and stores them in the descriptor area 5. At this stage, the descriptor information generated by the CPU 6 includes no description of information on data amounts, and the in-use flags are off.

The CPU 6 refers to reception descriptors whose in-use flags are on among reception descriptors stored in the descriptor area 5 to read data from the reception FIFO memory 3 or the data storage area 4 and executes various processes using the data. In this embodiment of the invention, no particular limitation is placed on processes executed by the CPU 6.

When the CPU 6 finishes the processes using the read data, the CPU deletes the data from the reception FIFO memory 3 or the data storage area 4 or transfers the data to another storage area (which is not shown in FIG. 2). The CPU updates or turns the in-use flags of the reception descriptors of the data off and notifies the access control unit 2 of the update. The deletion or transfer provides a vacancy in the capacity of the reception FIFO memory 3 or the data storage area 4, and new data acquired by the data acquisition unit 1 can be stored in the same. Thus, when data acquired by the data acquisition unit 1 at the next receiving opportunity and thereafter are to be stored, the access control unit 2 can know usable reception descriptors (descriptors having address information specifying addresses where data can be stored) by referring to the in-use flags of the reception descriptors stored in the descriptor area 5.

Each part of the data reception system 100 of the present embodiment operates as described above.

A description now will be given of an example of an operation of the data reception system 100 as a whole performed to receive data from the transmission path connected to the same using the above-described constituent parts.

Figure 3:
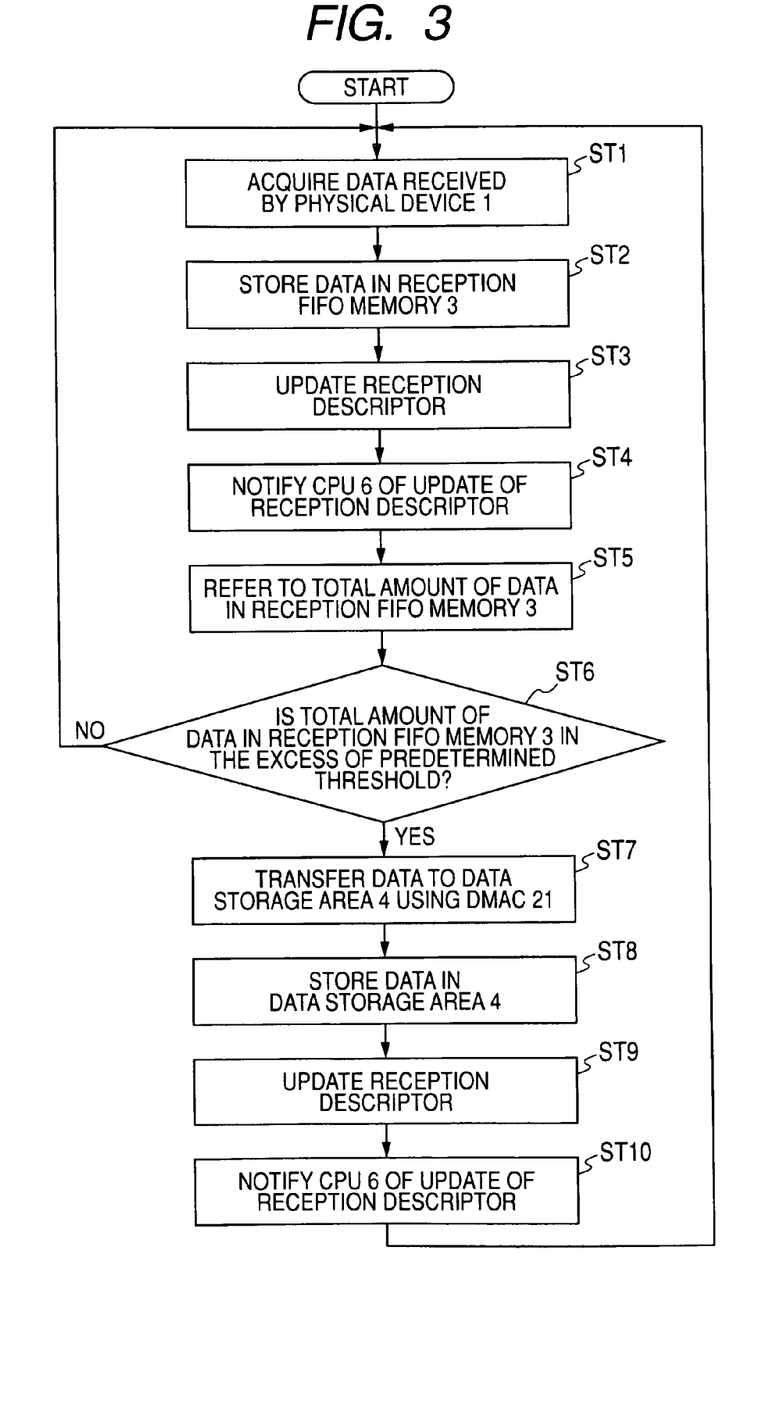
FIG. 3 is a flow chart showing an example of an operation of the data reception apparatus according to the first embodiment of the invention performed when data are received.

FIG. 3 is a flow chart showing the example of the operation of the data reception system 100 performed when data are received.

The flow chart in FIG. 3 shows a data receiving process at one receiving opportunity of the data reception system 100, and the operation shown in FIG. 3 is repeated in practice.

At step ST1, the data acquisition unit 1 passes data acquired from the transmission path to the access control unit 2.

At step ST2, the access control unit 2 refers to one of the reception descriptors associated with the reception FIFO memory 3 stored in the descriptor area 5 and stores the data acquired at step ST1 in the reception FIFO memory 3 based on address information described in the reception descriptor.

At step ST3, the access control unit 2 updates the reception descriptor referred to when the data was stored in the reception FIFO memory 3 at step ST2. Specifically, the access control unit 2 additionally writes the amount of the data stored in the reception FIFO memory 3 in the reception descriptor associated with the reception FIFO memory 3 referred to at step ST2 and turns the in-use flag of the descriptor on.

At step ST4, the access control unit 2 notifies the CPU 6 of the update of the reception descriptor made at step ST3.

The CPU 6 knows that the data has been received from the notice, and a process using the data can be now executed.

At step ST5, the access control unit 2 refers to the reception FIFO memory 3 to check the total amount of data stored in the reception FIFO memory 3, At step ST6, the access control unit 2 compares the total amount of data stored in the reception FIFO memory 3 checked at step ST5 with a predetermined threshold. When the total amount of data is equal to or smaller than the predetermined threshold, the process returns to step ST1. When the total amount is in excess of the predetermined threshold, the process proceeds to step ST7.

At step ST7, the DMAC 21 of the access control unit 2 transfers the data that has been acquired from the data acquisition unit 1 at step ST1 and temporarily stored in the reception FIFO memory 3 at step ST2 to the data storage area 4.

At step ST8, the access control unit 2 refers to one of the reception descriptors associated with the data storage area 4 stored in the descriptor area 5, and the unit stores the data transferred by the DMAC 21 at step ST7 in the data storage area 4 according to address information in the reception descriptor.

At step ST9, the access control unit 2 updates the reception descriptor referred to when the data was stored in the data storage area 4 at step ST8. Specifically, the access control unit 2 deletes the data amount from the reception descriptor associated with the reception FIFO memory 3 updated at step ST3 and turns the in-use flag off. The unit additionally writes the amount of stored in the data storage area 4 at step ST8 in the reception descriptor associated with the data storage area 4 at step ST8 and turns the in-use flag of the descriptor on.

At step ST10, the access control unit 2 notifies the CPU 6 of the update of the reception descriptor made at step ST9.

The CPU 6 knows that the data has been received from the notice, and a process using the data can be now executed.

After the step is finished, the process returns to step ST1 to process data acquired by the data acquisition unit 1 from the transmission path at the next opportunity of reception.

The data reception system 100 of the present embodiment repeats the operation of storing data from the transmission path, as described above.

The above-described data reception system 100 of the present embodiment has two storage units, i.e., the reception FIFO memory 3 and the data storage area 4.

As described above, in the data reception system 100 of the present embodiment, the access control unit 2 temporarily stores data acquired by the data acquisition unit 1 from the transmission path in the reception FIFO memory 3 by referring to one of the reception descriptors associated with the reception FIFO memory 3. Thereafter, when the total amount of data stored in the reception FIFO memory 3 is equal to or smaller than the predetermined threshold, the temporarily stored data is left as it is. When the total amount of data stored in the reception FIFO memory 3 is in excess of the predetermined threshold, the data temporarily stored in the reception FIFO memory 3 is transferred to the storage area 4 and stored therein. The reception FIFO memory 3 operates at a high speed, although it has a small capacity. The data storage area 4 is slower compared to the reception FIFO memory 3, although it has a larger capacity. Therefore, the data reception system 100 of the present embodiment can store data in the reception FIFO memory 3 at a high speed when the reception FIFO memory 3 has a vacancy in its capacity. When the reception FIFO memory 3 has no vacancy in its capacity, data can be stored reliably in the data storage area 4 having a larger capacity. In particular, the data is DMA-transferred by the DMAC 21 when it is stored in the data storage area 4, whereas the data can be stored at a higher speed when it is stored in the reception FIFO memory 3, because DMA transfer is not required.

In the data reception system 100 of the present embodiment, when the total amount of data stored in the reception FIFO memory 3 is in excess of the predetermined threshold, the access control unit 2 transfers the data temporarily stored in the reception FIFO memory 3 on a DMA basis using the DMAC 21 to store the data in the data storage area 4. The excess of the total amount of data stored in the reception FIFO memory 3 over the predetermined threshold is a state in which the CPU 6 cannot process all pieces of data acquired by the data acquisition unit 1 from the transmission path. This state may occur when there is an increase in the speed of data reception from the transmission path. In the data reception system 100 of the present embodiment, data acquired from the transmission path and temporarily stored in the reception FIFO memory 3 can be stored in the data storage area 4 having a larger capacity compared to the reception FIFO memory 3 even in such a state. Thus, a failure in data reception or a loss of data can be prevented.

In the first embodiment of the invention, a determination method in which the amount of data in the reception FIFO memory 3 is compared with a predetermined threshold as a reference has been described as an exemplary method of determining in which of the storage areas, i.e., the reception FIFO memory 3 and the data storage area 4, the data acquired by the data acquisition unit 1 from the transmission path is to be stored. The invention is not limited to such a configuration. For example, the determination of is which of the reception FIFO memory 3 and the data storage area 4 the data acquired by the data acquisition unit 1 is to be stored can be made based on the size of the amount of the data acquired within a predetermined period of time as a reference. Further, the determination of is which of the reception FIFO memory 3 and the data storage area 4 the acquired data is to be stored can be made based on the content of the acquired data.

The first embodiment of the invention has been described as a case in which there are two data storage areas, i.e., the reception FIFO memory 3 and the data storage area 4. The invention is not limited to such a configuration, and a plurality of the reception FIFO memories 3 and a plurality of the data storage areas 4 may be provided.

Second Embodiment

A data reception system 101 as a second embodiment of the data reception system according to the invention now will be described.

The data reception system 101 of the present embodiment is similar in configuration to the data reception system 100 of the first embodiment except for an access control unit 2a and a CPU 6a.

The data reception system 101 of the present embodiment includes a data acquisition unit 1, an access control unit 2a, a reception FIFO memory 3 (which corresponds to the first storage area of the invention), a data storage area 4 (which corresponds to the second storage area of the invention), a descriptor area 5, and a CPU 6a (which corresponds to the control unit of the invention).

The data reception system 101 of the present second embodiment is different from the data reception system 100 described above as the first embodiment of the invention in the processes associated with reception descriptors.

In the data reception system 100 of the first embodiment, reception descriptors associated with the reception FIFO memory 3 and the data storage area 4, respectively, are stored in the descriptor area 5 in advance. The access control unit 2 acquires data from the data acquisition unit 1 and temporarily stores the data in the reception FIFO memory 3. Thereafter, the unit 2 determines in which of the storage areas, i.e., the reception FIFO memory 3 and the data storage area 4, the data temporarily stored in the reception FIFO memory 3 is to be stored according to the total amount of data in the reception FIFO memory 3. The unit 2 refers to a reception descriptor associated with the storage area where the data is to be stored, stores the data according to address information described in the descriptor, and updates the reception descriptor thus referred to after the data is stored.

In the data reception system 101 of the second embodiment, the CPU 6a generates reception descriptors having no description of address information and data amounts and stores them in the descriptor area 5 in advance. The access control unit 2a stores data in the reception FIFO memory 3 or the data storage area 4 and thereafter updates the relevant reception descriptor based on the address information and the data amount of the data.

In the data reception system 100 of the first embodiment, the access control unit 2 stores data acquired by the data acquisition unit 1 based on address information described in a reception descriptor generated by the CPU 6. In the data reception system 101 of the second embodiment, when data are stored in the reception FIFO memory 3 or the data storage area 4, the position to store the data is determined by the access control unit 2a. After the data is stored, the address where the data is stored is described in the relevant reception descriptor as address information.

The operation of each part of the second embodiment now will be described. Operations of the data acquisition unit 1, the reception FIFO memory 3, the data storage area 4, and the descriptor area 5 of the present embodiment will not be described because they are similar to the operations described above for the first embodiment.

The access control unit 2a receives data acquired by the data acquisition unit 1 from the transmission path and refers to the reception FIFO memory 3 to determine the addresses to store the data based on the data amount of the acquired data. The data acquired from the data acquisition unit 1 is stored in the addresses in the reception FIFO memory 3 thus determined. At the same time, one reception descriptor having an in-use flag in an off-state is selected from among the reception descriptors stored in the descriptor area 5 based on the data amount of the data thus stored. The address information and the data amount are additionally written in the selected reception descriptor, and the in-use flag is turned on.

Next, the access control unit 2a refers to the total amount of data stored in the reception FIFO memory 3. When the total amount is equal to or smaller than a predetermined threshold, the data temporarily stored in the reception FIFO memory 3 is left as it is. When the total amount is in excess of the predetermined threshold, the control unit 2a transfers the data to the data storage area 4, which will be described later, to store the data in the area.

At this time, based on the amount of the transferred data, the access control unit 2a determines the address in the data storage area 4 where the data is to be stored and stores the data in the address thus determined.

The access control unit 2a selects one reception descriptor having an in-use flag in an off-state from among the reception descriptors stored in the descriptor area 5, additionally writes the address information and the data amount in the selected reception descriptor, and turns the in-use flag on.

Address information in the present embodiment now will be described.

Figure 4:
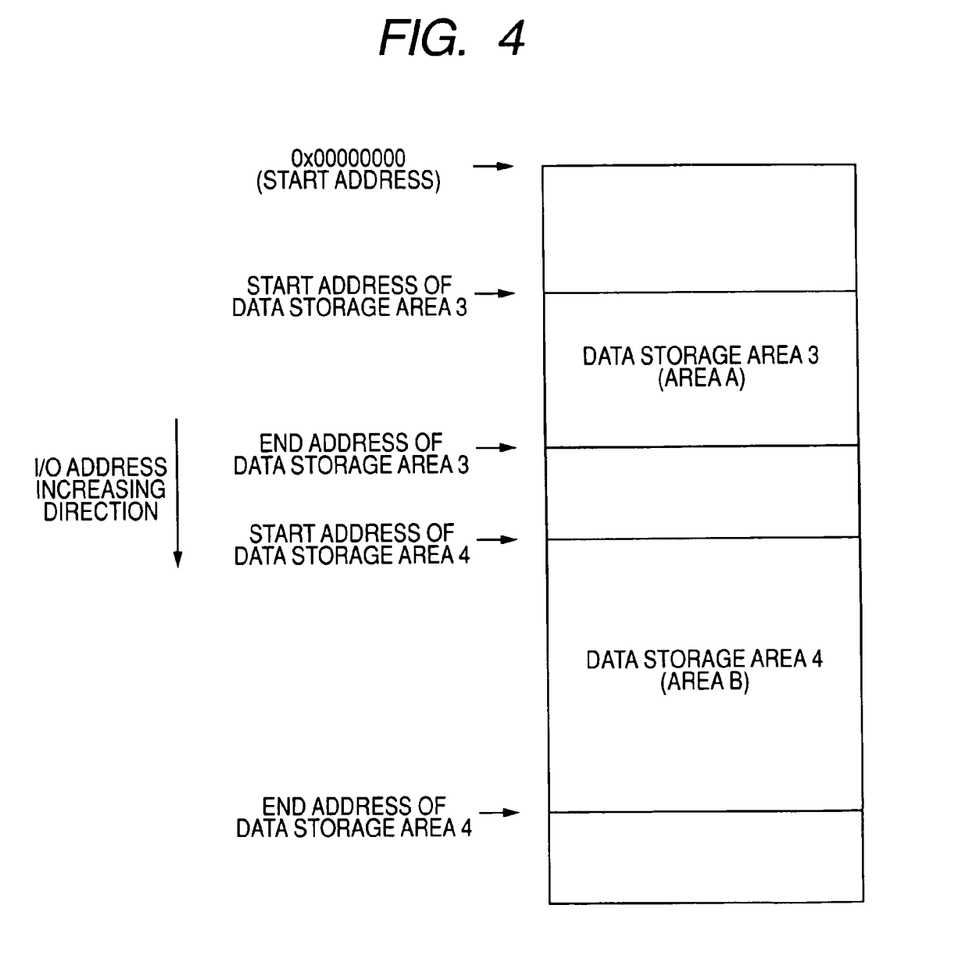
FIG. 4 is a conceptual illustration of address information.

Address information in the present embodiment is specified as an I/O (In/Out) address as viewed from the CPU 6a. FIG. 4 is a conceptual illustration of address information in the present embodiment.

FIG. 4 is a conceptual illustration of address information, and it conceptually shows an I/O addresses in the reception FIFO memory 3 and the data storage area 4 as viewed from the CPU 6a.

An area A shown in FIG. 4 is a group of addresses representing the reception FIFO memory 3, and an area B is a group of addresses representing the data storage area 4. For example, 32-bit I/O addresses are used.

A description now will be given of a method that may be used by the access control unit 2a for determining an address to store data.

When it is determined that the data is to be stored in the reception FIFO memory 3, the access control unit 2a searches a vacant region in the area A and acquires the start address of the vacant area. The data is stored from the beginning of the vacant region.

A similar process is executed when it is determined to store data in the data storage area 4. The access control unit 2a searches a vacant region in the area B and acquires the start address of the vacant region. The data is stored from the beginning of the vacant region.

The storage areas can be used effectively by storing data in the storage areas as thus described. Further, since data transfer from the reception FIFO memory 3 to the data storage area 4 is partially omitted, an improvement of performance can be achieved.

In the data reception system 100 described as the first embodiment, the access control unit 2 stores data in a specified address according to address information specified when the CPU 6 generates a reception descriptor. Specifically, the CPU 6 generates a reception descriptor before the data acquisition unit 1 actually acquires data, and the address information described in the reception descriptor generated by the CPU 6 is set regardless of the size of the data. Therefore, when the CPU 6 generates a new reception descriptor, it is desirable to set the address information in the reception descriptor so as to allow storage of the maximum amount of data (1.5 Kbytes) that the data acquisition unit 1 can acquire at one opportunity of reception. As a result, when the amount of data actually acquired by the data acquisition unit 1 is less than 1.5 Kbytes, there may be a gap between pieces of data when they are stored in a storage area (the end address of one piece of data may not be continuous with the start address of the next piece of data).

In the data reception system 101 of the second embodiment, since the access control unit 2a always stores data from the start address of a vacant region, the end address of one piece of data is always continuous with the start address of the next piece of data. Therefore, a storage area can be effectively used because wasteful use of the storage area attributable to gaps between pieces of data can be avoided.

The CPU 6a exercises overall control of various parts of the data reception system 101.

The CPU 6a generates reception descriptors which do not include either address information or data amount and stores them in the descriptor area 5 in advance.

After data acquired by the data acquisition unit 1 is stored in the reception FIFO memory 3 or the data storage area 4 by the access control unit 2a, the CPU 6a is notified of the operation by the access control unit 2a. The CPU 6a reads the data by referring to the reception descriptor updated by the access control unit 2a and executes various processes using the data. In this embodiment of the invention, there is no limitation on the various processes executed by the CPU 6a. The data is deleted from the reception FIFO memory 3 or the data storage area 4 or transferred to another storage area after it is used for the processes executed by the CPU 6a. This deleting or transfer process produces a vacancy in the capacity of the reception FIFO memory 3 or the data storage area 4, and new data acquired by the data acquisition unit 1 can be stored in the vacancy. Specifically, the CPU 6a deletes the address information and the data amount in the reception descriptor of the data that has been used for processing, returns the in-use flag to the off-state, and notifies the access control unit 2a of those operations. Thus, the access control unit 2a now has knowledge of the reception descriptors which are usable for the storage of the next data.

As described above, in the data reception system 101 of the second embodiment of the invention, the CPU 6a generates reception descriptors that do not include either address information or data amount and stores them in the descriptor area 5 before data is acquired. The access control unit 2a determines a position in the reception FIFO memory 3 or the data storage area 4 where data acquired by the data acquisition unit 1 is to be stored, describes reception descriptors based on the address information and data amount of the position where the data is stored, and updates or turns the in-use flags on. At this time, the position to store the data is determined by searching a vacant region of the storage area and starting the storage of the data at the start address of the vacant region. Therefore, the storage area can be more effectively used compared to a case in which a CPU generates reception descriptors including address information of data storing positions.

Referring to the address information in the second embodiment, addresses in both of the reception FIFO memory 3 and the data storage area 4 are managed as I/O addresses as viewed from the CPU 6a. Therefore, it is not required to provide both of the reception descriptors associated with the reception FIFO memory 3 and the reception descriptors associated with the data storage area 4 in advance as in the first embodiment, and the capacity of the descriptor area can be smaller.

The data reception system 101 of the second embodiment is similar to the data reception system 100 of the first embodiment in that the access control unit 2a transfers data acquired by the data acquisition unit 1 on a DMA basis using a DMAC 21 to store the data in the data storage area 4 when the amount of data stored in the reception FIFO memory 3 is in excess of a predetermined threshold. Therefore, in addition to the above-described advantage, the data reception system 101 is advantageous in that a failure of data reception or a loss of data can be avoided and in that data can be stored at a higher speed.

Third Embodiment

A data reception system 102 as a third embodiment of the data reception system according to the invention now will be described.

The data reception system 102 of the third embodiment is similar in configuration to the data reception system 100 of the first embodiment and the data reception system 101 of the second embodiment except for an access control unit 2b and a CPU 6b.

The data reception system 102 of the third embodiment includes a data acquisition unit 1, an access control unit 2b, a reception FIFO memory 3 (which corresponds to the first storage area of the invention), a data storage area 4 (which corresponds to the second storage area of the invention), a descriptor area 5, and a CPU 6b (which corresponds to the control unit of the invention).

The data reception system 102 of the third embodiment is different from the data reception system 101 described above as the second embodiment of the invention in the processes associated with reception descriptors.

In the data reception system 101 of the second embodiment, the CPU 6a generates reception descriptors having no description of address information and a data amount and stores them in the descriptor area 5 in advance. The access control unit 2a stores data in a position determined by searching the reception FIFO memory 3 and the data storage area 4 to find a vacant region. The control unit updates a reception descriptor based on the address information and the amount of the amount.

In the data reception system 102 of the third embodiment, the CPU 6b generates no reception descriptor, and the access control unit 2a generates a reception descriptor when it stores data acquired by the data acquisition unit 1 in the reception FIFO memory 3 or the data storage area 4.

That is, the present embodiment is different from the second embodiment in that the CPU 6a generates reception descriptors in the data reception system 101 of the second embodiment whereas reception descriptors are generated by the access control unit 2b in the data reception system 102 of the present embodiment.

Each part of the data reception system 102 of the third embodiment now will be described. Operations of the data acquisition unit 1, the reception FIFO memory 3, the data storage area 4, and the descriptor area 5 of the present embodiment will not be described because they are similar to the operations described above as the first embodiment.

The access control unit 2b receives data acquired by the data acquisition unit 1 from the transmission path and temporarily stores the acquired data in the reception FIFO memory 3. At this time, the access control unit 2b generates a reception descriptor describing the address information of the region in the reception FIFO memory 3 where the data is stored and the data amount of the stored data and having an in-use flag in an on-state and stores the descriptor in the descriptor area 5.

Next, the access control unit 2b refers to the total amount of data already stored in the reception FIFO memory 3, just like the access control unit 2 of the data reception system 100 of the first embodiment and the access control unit 2a of the data reception system 101 of the second embodiment. When the total amount is equal to or smaller than a predetermined threshold, the unit leaves the data stored in the reception FIFO memory 3 as it is. When the total amount is in excess of the predetermined threshold, the unit transfers the data so as to store it in the data storage area 4.

After storing the data in the data storage area 4, the access control unit 2b generates a reception descriptor describing the address information and the data amount of the stored data and having an in-use flag in the on-state.

The CPU 6b exercises overall control of various parts of the data reception system 102.

The CPU 6b reads data stored in the reception FIFO memory 3 or the data storage area 4 by referring to a reception descriptor having an in-use flag in the on-state stored in the descriptor area 5 and executes various processes using the data. In the present embodiment of the invention, no particular limitation is placed on the various processes executed by the CPU 6b. When the CPU 6b finishes the processes using the data, the data is deleted from the reception FIFO memory 3 or the data storage area 4 or transferred to another storage area. The transfer process produces a vacancy in the capacity of the reception FIFO memory 3 and the data storage area 4, and new data acquired by the data acquisition unit 1 now can be stored. Specifically, the CPU 6b deletes the address information and the data amount of the reception descriptor of the data that has been used for processing, returns the in-use flag of the descriptor to the off-state, and notifies the access control unit 2b of those operations. As a result, the access control unit 2b knows the reception descriptor which can be used to store the next data.

The CPU 6b provides the access control unit 2b with information on a vacant region in the descriptor area 5 before the access control unit 2b generates the reception descriptor. The access control unit 2b stores the reception descriptor that it has generated in the descriptor area based on the information.

As described above, in the data reception system 102 of the third embodiment, the access control unit 2b determines a position to store data, stores the data, and then generates a reception descriptor including the address information and the data amount of the position where the data is stored. Therefore, the CPU 6b can be prevented from taking heavy loads attributable to the generation of a reception descriptor. When the access control unit 2b stores data in the reception FIFO memory 3 or the data storage area 4, it is not required to read a reception descriptor generated and stored in the descriptor area 5 in advance. Therefore, the CPU can avoid a delay in executing the predetermined processes using the data, whereas such a delay can occur in a data reception system according to the related art when an access control unit has a delay in storing acquired data because it is unable to read a reception descriptor for a reason such as a busy state of the CPU.

The invention is not limited to the above-described embodiments.

It should be understood by those skilled in the art that various modifications, combinations, subcombinations, and alterations may occur depending on design requirements and other factors insofar as they are within the scope of the appended claims or the equivalents thereof.

What is claimed is:

1. A data reception system comprising:
a data acquisition interface configured to acquire data from a predetermined transmission path;
an access controller configured to store the data acquired by the data acquisition interface in a predetermined section of a plurality of storage areas;
the plurality of storage areas including:
a first storage area, and
a second storage area that has a greater storable capacity and a lower storing speed compared to the first storage area;
a controller configured
to generate a reception descriptor describing only information on a storage position in the predetermined section of the data, and
to read the data stored in the predetermined section by referring to the reception descriptor to execute a predetermined process; and
a descriptor area configured to store the reception descriptor,
wherein the access controller further includes a transfer unit and is further configured to temporarily store the total amount of data acquired by the data acquisition interface in the first storage area while determining whether the total amount of data acquired by the data acquisition interface is in excess of a predetermined threshold, and
if the total amount of data acquired by the data acquisition interface is in excess of the predetermined threshold, the access controller causes the transfer unit to transfer the data acquired by the data acquisition interface to the second storage area, and
wherein after the reception descriptor is generated with only information on the storage position, the access controller adds a flag indicating that the reception descriptor is in use to the reception descriptor when the controller refers to the reception descriptor to execute the predetermined process.

2. A data reception system according to claim 1, wherein the access controller
updates the reception descriptor stored in the descriptor area to include updated information on a position in the first storage area or the second storage area to store the data acquired by the data acquisition interface when the data is stored in the first storage area or the second storage area, and
reads the reception descriptor to have the data stored in the first and second storage area based on the updated information in the reception descriptor.

3. A data reception system according to claim 1, wherein the access controller updates any reception descriptor in the descriptor area with updated information on a position in the first storage area or the second storage area to store the data acquired by the data acquisition interface in when the data is stored in the plurality of storage areas, and
wherein the controller reads the data stored in the first storage area or the second storage area by referring to the updated information in any reception descriptor and executes a predetermined process using the data relative to the reception descriptor that was referred to.

4. A data reception system according to claim 1, wherein the determination of whether the acquired data should be stored in the first storage area or the second storage area is based on the size of the amount of data acquired within a predetermined period of time.

5. A data reception system according to claim 1, wherein the determination of whether the acquired data should be stored in the first storage area or the second storage area is based on the content of the acquired data.

6. A data reception system according to claim 1, wherein the storage position of the acquired data in the first storage area or the second storage area is determined by searching for a vacant region in the first storage area or second storage area and starting the storage position of the acquired data at a start address of the vacant region.

7. A data reception system comprising:
a data acquisition interface configured to acquire data from a predetermined transmission path;
an access controller configured to store the data acquired by the data acquisition interface in a section of a plurality of storage areas;
a plurality of storage areas, including:
a first storage area, and
a second storage area that has a greater storable capacity and a lower storing speed compared to the first storage area;
a controller; and
a descriptor area configured to store a reception descriptor,
wherein the access controller further includes a transfer unit and is further configured to temporarily store the total amount of data acquired by the data acquisition interface in the first storage area while determining whether the total amount of data stored in the first storage area is in excess of a predetermined threshold, and if the total amount of data acquired by the data acquisition unit is in excess of the predetermined threshold, the access controller
causes the transfer unit to transfer the data acquired by the data acquisition interface to the second storage area,
updates the reception descriptor by adding a flag indicating that the reception descriptor is in use to the descriptor, and
notifies the controller of the update of the reception descriptor,
wherein after the reception descriptor is generated with only information on the storage position, the access controller adds a flag indicating that the reception descriptor is in use to the reception descriptor when the controller refers to the reception descriptor to execute the predetermined process, and
wherein the controller reads the data stored in the first storage area or the second storage area by referring to the reception descriptor and executes a predetermined process using the data.

8. A data reception system comprising:
a data acquisition interface configured to acquire data from a predetermined transmission path;
an access controller that stores the data acquired by the data acquisition interface in a predetermined section of a plurality of storage areas;
a plurality of storage areas including;
a first storage area, and
a second storage area that has a greater storable capacity and a lower storing speed compared to the first storage area;
a descriptor area configured to store a reception descriptor; and a controller that generates a reception descriptor excluding the information on the position to store data before the data acquisition interface acquires data and that stores the descriptor in the descriptor area, wherein the access controller further includes a transfer unit and is further configured to temporarily store the total amount of data acquired by the data acquisition interface in the first storage area while determining whether the total amount of data stored in the first storage area is in excess of a predetermined threshold, and if the total amount of data acquired by the data acquisition interface is in excess of the predetermined threshold, the access controller causes the transfer unit to transfer the data acquired by the data acquisition interface to the second storage area, and to describe any reception descriptor in the descriptor area to include information on the position in the first storage area or the second storage area where the data acquired by the data acquisition interface is to be stored when the data is stored in the first storage area or the second storage area wherein after the reception descriptor is generated with only information on the storage position, the access controller adds a flag indicating that the reception descriptor is in use to the reception descriptor when the controller refers to the reception descriptor to execute the predetermined process, and wherein the controller reads the data stored in the first storage area or the second storage area by referring to the reception descriptor and executes a predetermined process using the data.

9. A data reception system comprising:

a data acquisition interface configured to acquire data from a predetermined transmission path;

an access controller that stores the data acquired by the data acquisition interface in a predetermined section of a plurality of storage areas;

a plurality of storage areas including:
    a first storage area, and
    a second storage area having-that has a greater storable capacity and a lower storing speed compared to the first storage area;

a descriptor area configured to store a reception descriptor; and a controller, wherein the access controller further includes a transfer unit and is further configured to temporarily store the total amount of data acquired by the data acquisition interface in the first storage area while determining whether the total amount of data stored in the first storage area is in excess of a predetermined threshold, and if the total amount of data acquired by the data acquisition interface is in excess of the predetermined threshold, the access controller causes the transfer unit to transfer the data acquired by the data acquisition interface to the second storage area, and to generate a reception descriptor describing information on the position in the first storage area or the second storage area where the data acquired by the data acquisition interface is to be stored when the data is stored in the first storage area or the second storage area, wherein after the reception descriptor is generated with only information on the storage position, the access controller adds a flag indicating that the reception descriptor is in use to the reception descriptor when the controller refers to the reception descriptor to execute the predetermined process, and wherein the controller reads the data stored in the first storage area or the second storage area by referring to the reception descriptor and executes a predetermined process using the data.

* * * * *